United States Patent
Drake et al.

[11] Patent Number: 5,952,259
[45] Date of Patent: *Sep. 14, 1999

[54] PROCESS FOR MAKING AN ACID-BASE LEACHED ZEOLITE CATALYST

[75] Inventors: Charles A. Drake, Nowata; An-hsiang Wu, Bartlesville, both of Okla.

[73] Assignee: Phillips Petroleum Company, Bartlesville, Okla.

[*] Notice: This patent is subject to a terminal disclaimer.

[21] Appl. No.: 09/104,951

[22] Filed: Jun. 25, 1998

Related U.S. Application Data

[62] Division of application No. 08/673,238, Jun. 26, 1996, Pat. No. 5,827,422.

[51] Int. Cl.⁶ ..................................................... B01J 29/40
[52] U.S. Cl. ............................... 502/85; 502/66; 502/86; 502/77
[58] Field of Search ................................. 502/66, 85, 86, 502/77

[56] References Cited

U.S. PATENT DOCUMENTS 3,702,886  11/1972  Argauer et al. ........................... 502/77
4,485,185  11/1984  Onodera et al. ........................... 502/77

*Primary Examiner*—Thomas Dunn
*Attorney, Agent, or Firm*—Reece A. Scott

[57] ABSTRACT

A catalyst composition and a process for converting a hydrocarbon stream such as, for example, gasoline to olefins and $C_6$ to $C_8$ aromatic hydrocarbons such as toluene and xylenes are disclosed. The catalyst composition comprises an alumina and a silica wherein the weight ratio of aluminum to silicon is in the range of from about 0.002:1 to about 0.25:1. The process comprises contacting a hydrocarbon stream with the catalyst composition under a condition sufficient to effect the conversion of a hydrocarbon to an olefin and a $C_6$ to $C_8$ aromatic hydrocarbon. Also disclosed is a process for producing the catalyst composition which comprises: (1) contacting a zeolite with an effective amount of a base under a condition sufficient to effect a reduction in silicon content of said zeolite to produce a base-leached zeolite; and (2) contacting said base-leached zeolite with an effective amount of an acid under a condition sufficient to effect a reduction in aluminum content of said base-leached zeolite.

8 Claims, No Drawings

PROCESS FOR MAKING AN ACID-BASE LEACHED ZEOLITE CATALYST

This application is a division of application Ser. No. 08/673,238 filed on Jun. 26, 1996, now U.S. Pat. No. 5,827,422.

FIELD OF THE INVENTION

This invention relates to a catalyst composition useful for converting a hydrocarbon to a $C_6$ to $C_8$ aromatic hydrocarbon and an olefin and to a process for using the composition for converting a hydrocarbon to a $C_6$ to $C_8$ aromatic hydrocarbon and an olefin.

BACKGROUND OF THE INVENTION

It is well known to those skilled in the art that aromatic hydrocarbons and olefins are each a class of very important industrial chemicals which find a variety of uses in petrochemical industry. It is also well known to those skilled in the art that catalytically cracking gasoline-range hydrocarbons produces lower olefins such as, for example, propylene; and aromatic hydrocarbons such as, for example, benzene, toluene, and xylenes (hereinafter collectively referred to as BTX) in the presence of catalysts which contain a zeolite. The product of this catalytic cracking process contains a multitude of hydrocarbons including unconverted $C_5+$ alkanes; lower alkanes such as methane, ethane, and propane; lower alkenes such as ethylene and propylene; and $C_9+$ aromatic hydrocarbons. Recent efforts to convert gasoline to more valuable petrochemical products have therefore focused on improving the conversion of gasoline to olefins and aromatic hydrocarbons by catalytic cracking in the presence of zeolite catalysts. For example, a gallium-promoted zeolite ZSM-5 has been used in the so-called Cyclar Process to convert a hydrocarbon to BTX. The olefins and aromatic hydrocarbons can be useful feedstocks for producing various organic compounds and polymers. However, the weight ratio of olefins to aromatic compounds produced by the conversion process is generally less than 50%. Therefore, development of a catalyst and a process for converting hydrocarbons to the more valuable olefins would be a significant contribution to the art and to the economy.

SUMMARY OF THE INVENTION

An object of this invention is to provide a catalyst composition which can be used to convert a hydrocarbon to a $C_6$ to $C_8$ aromatic hydrocarbon and an olefin. Also an object of this invention is to provide a process for producing the catalyst composition. Another object of this invention is to provide a process which can employ the catalyst composition to convert a hydrocarbon to an olefin and a $C_6$ to $C_8$ aromatic hydrocarbon. An advantage of the catalyst composition is that it enhances the ratio of produced olefins to BTX. Other objects and advantages will becomes more apparent as this invention is more fully disclosed hereinbelow.

According to a first embodiment of the present invention, a composition which can be used as a catalyst for converting a hydrocarbon or a hydrocarbon mixture to an olefin and a $C_6$ to $C_8$ aromatic hydrocarbon is provided. The composition is an aluminosilicate which comprises, a silica, an alumina, and optionally platinum wherein the weight ratio of elemental aluminum to elemental silicon is in the range of from about 0.002:1 to about 0.25:1 and the weight ratio of the optimal platinum to silicon is in the range of from about 0.0005:1 to about 0.01:1.

According to a second embodiment of the present invention, a process which can be used for producing a catalyst composition is provided. The process comprises the steps: (1) contacting a zeolite which comprises or consists essentially of a silica and an alumina with a base in an amount and under a condition effective to reduce the silica content of the zeolite to produce a silica-reduced zeolite; (2) contacting said silica-reduced zeolite with an acid in an amount and under a condition effective to reduce the alumina content of the silica-reduced zeolite to produce a silica- and alumina-reduced zeolite; and optionally (3) contacting the silica- and alumina-reduced zeolite with a platinum precursor.

According to a third embodiment of the present invention, a process which can be used for converting a hydrocarbon or a hydrocarbon mixture to an olefin and a $C_6$ to $C_8$ aromatic hydrocarbon is provided which comprises, consists essentially of, or consists of, contacting a fluid which comprises a hydrocarbon or a hydrocarbon mixture with a catalyst composition which is the same as disclosed above in the first embodiment of the invention under a condition effective to convert a hydrocarbon to an olefin and an aromatic hydrocarbon containing 6 to 8 carbon atoms per molecule wherein the weight ratio of the olefin to aromatic compound is enhanced.

DETAILED DESCRIPTION OF THE INVENTION

The catalyst composition of the first embodiment of the present invention can comprise, consist essentially of, or consist of a silica and an alumina. The catalyst composition can also comprise, consist essentially of, or consist of a silica, alumina, and platinum.

According to the present invention the weight ratio of element aluminum to element silicon can be in the range of from about 0.002:1 to about 0.25:1, preferably about 0.004:1 to about 0.2:1, more preferably about 0.005:1 to about 0.15:1, and most preferably 0.006:1 to 0.1:1. The weight ratio of element platinum to element silicon can be in the range of from about 0.0001:1 to about 0.02:1, preferably about 0.0005:1 to about 0.02:1, more preferably about 0.001:1 to about 0.02:1, and most preferably 0.002:1 to 0.01:1.

Alternatively, the weight of element aluminum in the invention composition can be in the range of from about 0.1 to about 10, preferably about 0.2 to about 8, and most preferably 0.5 to 5 grams per 100 grams of the composition. The weight of element silicon can be in the range of from about 25 to about 45, preferably about 30 to about 45, and most preferably 35 to 40 grams per 100 grams of the composition. The weight of platinum can be in the range of from about 0.01 to about 2, preferably about 0.05 to about 1.5, and most preferably 0.1 to 1.2 grams per 100 grams of the composition. The composition can also be characterized by having the following physical characteristics: a surface area as determined by the BET method using nitrogen in the range of from about 300 to about 600, preferably 350 to 500 $m^2/g$; a pore volume in the range of from about 0.4 to about 0.8, preferably about 0.5 to about 0.75, and most preferably 0.6 to 0.75 ml/g; an average pore diameter in the range of from about 70 to about 300, preferably about 100 to about 250, and most preferably 125 to 200 Å; and a porosity of more than about 50%. Detailed physical property analyses are disclosed hereinbelow in the Examples section.

The composition of the present invention can be prepared by combining any alumina and any silica in the element weight ratios disclosed above under any conditions sufficient to effect the formation of an aluminosilicate.

However, it is presently preferred that the composition of the present invention be produced by the process disclosed in the second embodiment of the invention. In the first step of the second embodiment of the invention, a zeolite is contacted with a base under a condition sufficient to effect the formation of a silica-reduced zeolite.

Any commercially available zeolites can be employed as a starting material of the process of the second embodiment of the invention. Examples of suitable zeolites include, but are not limited to, those disclosed in Kirk-Othmer Encyclopedia of Chemical Technology, third edition, volume 15 (John Wiley & Sons, New York, 1991) and in W. M. Meier and D. H. Olson, "Atlas of Zeolite Structure Types," pages 138–139 (Butterworth-Heineman, Boston, Mass., 3rd ed. 1992). ZSM-5 and similar zeolites that have been identified as having a framework topology identified as MFI are particularly preferred because of their shape selectivity.

According to the present invention, any base can be employed so long as the base can reduce the silica content of a zeolite. Examples of suitable base include, but are not limited to, tetramethylammonium hydroxide, tetraethylammonium hydroxide, tetrapropylammonium hydroxide, tetramethylammonium bisulfide, tetraethylammonium bisulfide, lithium hydroxide, sodium hydroxide, sodium hydrosulfide, sodium bisulfide, potassium hydroxide, calcium hydroxide, magnesium hydroxide, sodium bicarbonate, sodium carbonate, sodium oxide, sodium sulfide, magnesium oxide, calcium oxide, calcium carbonate, sodium phenoxide, barium phenoxide, calcium phenoxide, $R^1OM$, $R^1SM$, and combinations of any two or more thereof; where $R^1$ is a $C_1$–$C_{18}$ alkyl radical, or combinations of any two or more thereof and M is an alkali metal, an alkaline earth metal, or combinations of any two or more thereof. Among the bases, sodium hydroxide and sodium carbonate are preferred because they are readily available and inexpensive.

According to the present invention, any methods known to one skilled in the art to treat a solid catalyst with a base can be used to treat the raw zeolite material. Generally, a zeolite can be suspended in a solution comprising a base substantially dissolved or suspended therein. The concentration of the zeolite in the solution to prepare a suspension can be in the range of from about 0.01 to about 200, preferably about 0.1 to about 150, more preferably about 1 to about 100, and most preferably 5 to 75 grams per liter. The amount of base required is the amount that can maintain the solution in alkaline pH during the treatment. Preferably, the initial pH of the solution containing a zeolite is adjusted to above about 8, preferably above about 10, and most preferably above 12. Upon the pH adjustment of the solution, the solution can be subjected to a treatment at a temperature in the range of from about 30° C. to about 200° C., preferably about 50° C. to about 150° C., and most preferably 70° C. to 120° C. for about 10 minutes to about 30 hours, preferably about 30 minutes to about 25 hours, and most preferably 1 to 20 hours. The treatment can be carried out under a pressure in the range of from about 1 to about 10 atmospheres (atm), preferably about 1 atm. Thereafter, the treated zeolite can be washed with a running water for 1 to about 60 minutes followed by drying to produce a silica-reduced or base-leached zeolite. Any drying method known to one skilled in the art such as, for example, air drying, heat drying, spray drying, fluidized bed drying, or combinations of two or more thereof can be used.

The dried, silica-reduced zeolite can also be further washed, if desired, with a mild acid solution such as, for example, ammonium nitrate which is capable of bringing the pH of the wash to an acidic range. The volume of the acid generally can be the same volume as the base required to bring the pH to the range disclosed above. The mild acid treatment can be carried out under substantially the same conditions disclosed in the base treatment. Thereafter, the resulting solid can be washed and dried as disclosed above.

According to the second embodiment of the present invention, the base-leached or silica-reduced zeolite is subject to an acid treatment. Generally, the acid can be organic acids, inorganic acids, or combinations of any two or more thereof. The acid can also be a diluted aqueous acid solution. Examples of suitable acids include, but are not limited to sulfuric acid, hydrochloric acid, nitric acid, phosphoric acid, ammonium sulfate, ammonium chloride, ammonium nitrate, formic acid, acetic acid, trifluoroacetic acid, citric acid, trichloroacetic acid, p-toluenesulfonic acid, methanesulfonic acid, partially-neutralized acids, wherein one or more protons have been replaced with, for example, a metal (preferably an alkali metal), and combinations of any two or more thereof. Examples of partially neutralized acids include, but are not limited to, sodium bisulfate, sodium dihydrogen phosphate, potassium hydrogen tartarate, and combinations thereof. The presently preferred acids are hydrochloric acid and nitric acid for they are readily available.

Any methods known to one skilled in the art for treating a solid catalyst with an acid can be used in the acid treatment of the present invention. Generally, the silica-reduced or base-leached zeolite can be suspended in an acid solution. The concentration of the base-leached zeolite in the acid solution can be in the range of from about 0.01 to about 200, preferably about 0.1 to about 150, more preferably about 1 to about 100, and most preferably 5 to 75 grams per liter. The amount of acid required is the amount that can maintain the solution in acidic pH during the treatment. Preferably the initial pH of the acid solution containing a base-reduced zeolite is adjusted to lower than about 3, preferably lower than about 2, more preferably lower than about 1, and most preferably lower than 0.5. Upon the pH adjustment of the solution, the solution can be subjected to a treatment at a temperature in the range of from about 30° C. to about 200° C., preferably about 50° C. to about 150° C., and most preferably 70° C. to 120° C. for about 10 minutes to about 30 hours, preferably about 30 minutes to about 25 hours, and most preferably 1 to 20 hours. The treatment can be carried out under a pressure in the range of from about 1 to about 10 atmospheres (atm), preferably about 1 atm. Thereafter, the treated zeolite can be washed with a running water for 1 to about 60 minutes followed by drying to produce a silica- and alumina-reduced or base-acid-leached zeolite. Any drying method known to one skilled in the art such as, for example, air drying, heat drying, spray drying, fluidized bed drying, or combinations of two or more thereof can be used.

The dried, silica- and alumina-reduced zeolite can also be further washed, if desired, with mild acid solution such as, for example, ammonium nitrate which is capable of bringing the pH of the wash to acidic range. The volume of the acid generally can be the same volume as the base required to bring the pH to the range disclosed above. The mild acid treatment can be carried out under substantially the same conditions disclosed in the base treatment. Thereafter, the resulting solid can be washed and dried as disclosed above.

According to the third embodiment of the present invention, a process useful for converting an aliphatic hydrocarbon or a hydrocarbon mixture to a mixture rich in olefins and $C_6$ to $C_8$ aromatic hydrocarbons comprises, consists essentially of, or consists of contacting a fluid stream comprising a hydrocarbon or hydrocarbon mixture which comprises paraffins, olefins, naphthenes, and aromatic compounds with a catalyst composition under a condition sufficient to effect the conversion of a hydrocarbon mixture to a mixture rich in olefins and $C_6$ to $C_8$ aromatic hydrocarbons or to enhance the weight ratio of olefins (ethylene and propylene) to the $C_6$ to $C_8$ aromatic compounds. The catalyst composition is the same as that disclosed in the first embodiment of the invention. The term "fluid" is used herein to denote gas, liquid, vapor, or combinations thereof. The term "hydrocarbon" is generally referred to, unless otherwise indicated, as one or more hydrocarbons having from about 4 carbon atoms to about 30 carbon atoms, preferably about 5 to about 20 carbon atoms, and most preferably 5 to 16 carbon atoms per molecule. The term "enhanced" refers to an increased weight ratio of olefins to BTX employing the catalyst composition as compared to employing a non-base-acid-leached zeolite. Examples of a hydrocarbon include, but are not limited to, butane, isobutanes, pentane, isopentane, hexane, isohexane, cyclohexane, heptane, isoheptane, octane, isooctane, nonane, decane, undecane, dodecane, tridecane, tetradecane, pentadecane, hexadecane, butenes, isobutene, pentenes, hexenes, benzene, toluene, ethylbenzene, xylenes, and combinations of any two or more thereof.

Any fluid which contains a hydrocarbon as disclosed above can be used as the feed for the process of this invention. Generally, the fluid feed stream can also contain olefins, naphthenes (cycloalkanes), or some aromatic compounds. Examples of suitable, available fluid feeds include, but are not limited to, gasolines from catalytic oil cracking processes, pyrolysis gasolines from thermal cracking of saturated hydrocarbons, naphthas, gas oils, reformates, and combinations of any two or more thereof. The origin of this fluid feed is not critical. Though particular composition of a feed is not critical, a preferred fluid feed is derived from gasolines which generally contain more paraffins (alkanes) than combined content of olefins and aromatic compounds (if present).

The contacting of a fluid feed stream containing an aliphatic hydrocarbon with the catalyst composition can be carried out in any technically suitable manner, in a batch or semicontinuous or continuous process, under a condition effective to convert an aliphatic hydrocarbon to a $C_6$ to $C_8$ aromatic hydrocarbon. Generally, a fluid stream as disclosed above, preferably being in the vaporized state, is introduced into an aromatization reactor having a fixed catalyst bed, or a moving catalyst bed, or a fluidized catalyst bed, or combinations of any two or more thereof by any means known to one skilled in the art such as, for example, pressure, meter pump, and other similar means. Because an aromatization reactor and aromatization are well known to one skilled in the art, the description of which is omitted herein for the interest of brevity. The condition can include a weight hourly space velocity (WHSV) of the fluid stream in the range of about 0.01 to about 100, preferably about 0.05 to about 50, and most preferably 0.1 to 30 g feed/g catalyst/hour. Generally, the pressure can be in the range of from about 0 to about 1000 psig, preferably about 0 to about 200 psig, and most preferably 0 to 50 psig, and the temperature is about 250 to about 1000° C., preferably about 350 to about 750° C., and most preferably 450 to 650° C.

The process effluent generally contains a light gas fraction comprising hydrogen and methane; a $C_2$–$C_3$ fraction containing ethylene, propylene, ethane, and propane; an intermediate fraction including non-aromatic compounds higher than 3 carbon atoms; and a BTX aromatic hydrocarbons fraction (benzene, toluene, ortho-xylene, meta-xylene and para-xylene). Generally, the effluent can be separated into these principal fractions by any known methods such as, for example, fractionation distillation. Because the separation methods are well known to one skilled in the art, the description of which is omitted herein. The intermediate fraction can be recycled to an aromatization reactor described above, methane, ethane, and propane can be used as fuel gas or as a feed for other reactions such as, for example, in a thermal cracking process to produce ethylene and propylene. The olefins can be recovered and further separated into individual olefins by any method known to one skilled in the art. The individual olefins can then be recovered and marketed. The BTX fraction can be further separated into individual $C_6$ to $C_8$ aromatic hydrocarbon fractions. Alternatively, the BTX fraction can undergo one or more reactions either before or after separation to individual $C_6$ to $C_8$ hydrocarbons so as to increase the content of the most desired BTX aromatic hydrocarbon. Suitable examples of such subsequent $C_6$ to $C_8$ aromatic hydrocarbon conversions are disproportionation of toluene (to form benzene and xylenes), transalkylation of benzene and xylenes (to form toluene), and isomerization of meta-xylene and/or ortho-xylene to para-xylene.

After the catalyst composition has been deactivated by, for example, coke deposition or feed poisons, to an extent that the feed conversion and/or the selectivity to the desired ratios of olefins to BTX have become unsatisfactory, the catalyst composition can be reactivated by any means known to one skilled in the art such as, for example, calcining in air to burn off deposited coke and other carbonaceous materials, such as oligomers or polymers, preferably at a temperature of about 400 to about 650° C. The optimal time periods of the calcining depend generally on the types and amounts of deactivating deposits on the catalyst composition and on the calcination temperatures. These optimal time periods can easily be determined by those possessing ordinary skills in the art and are omitted herein for the interest of brevity.

The following examples are presented to further illustrate this invention and are not to be construed as unduly limiting the scope of the present invention.

EXAMPLE I

This example illustrates the preparation of catalyst composition of the invention.

A zeolite HZSM-5 purchased from UCI (United Catalysts, Inc., Louisville, Ky.) having a designate of T-4480 (obtained as a ¹⁄₁₆ inch extrudate) was used in the preparation of the catalyst composition of the invention. Thirty grams of T-4480 were added to 200 g of a basic solution in a beaker, wherein the basic solution was prepared by mixing 172 g of $Na_2CO_3 \cdot 10H_2O$, 4 g of NaOH, and 500 g of water, to prepare a suspension having a pH of 13. The suspension was then heated at 90° C. for 6 hours to prepare a base-treated zeolite. Thereafter, the spent basic solution was discarded by decantation. The base-treated zeolite was then washed with a running tap water for about 30 minutes. The washed, base-treated zeolite was then air-dried at room temperature (about 25° C). The air-dried, base-treated zeolite was then treated with 200 ml of a 1.0 M $NH_4NO_3$ solution for 16 hours at 90° C. to prepare a nitrated-treated, base-treated zeolite which upon discarding the spent nitrate solution, was then washed with a running tap water for about 30 minutes followed by air-dried. The air-dried material was then subject to calcining at 525° C. for 3 hours to prepare a silica-reduced or base-leached zeolite. A total of 14.08 g of the silica-reduced or base-leached zeolite was produced.

The silica-reduced zeolite was then combined with 180 g of 6N HCl and the resulting suspension was heated at 90° C. for 2 hours to prepare a base-acid-treated zeolite which was subject to washing and drying as described above and to calcining at 525° C. for 6 hours. The resulting dried product (10.56 g) was an alumina-reduced or base-acid-leached zeolite or the composition of the invention.

In comparative runs, 32.0 g of T-4480 was combined with 100 g of 6N HCl in a beaker to form a suspension. The suspension was heated at 90° C. for 2 hours. Upon decantation of spent HCl solution, the solid was washed, dried, and calcined as described above to produce 22.64 g of acid-leached zeolite.

Also in comparative runs, 30.0 g of T-4480 was combined with 230 ml of 3N HCl to form a suspension. The suspension was heated at 90° C. for 6 hours. Upon removal of spent HCl solution, the resulting solid was washed, dried, and calcined as described above to prepare a calcined zeolite (21.2 g) that had been treated with HCl. The calcined zeolite was then combined with 180 ml of 0.5N NaOH solution to form another suspension. However, upon the combining, a white, cloudy, milky solution formed indicating that the calcined zeolite dissolved in NaOH solution.

The above-produced zeolites including the original ZSM-5 (T-4480) zeolite and the invention catalyst composition were further analyzed for their surface area, pore volume, and pore radius (Table I) as well as the weight % of individual component (Table II).

The unit cell dimension (also referred to as unit cell size; measured in angstroms) was determined by X-ray diffraction, essentially in accordance with ASTM D 3942-80.

The ratio of Si atoms to Al atoms in the crystalline zeolite framework portion was determined by Si solid state NMR spectrometry, substantially in accordance with the procedure described by J. Klinowski et al in Nature, April 1982, Volume 296, pages 533–536. The Si:Al atomic ratio (or Si/Al) in the crystalline framework portion for the invention composition was found between 22.0 and 25.7.

Because zeolites generally also contain a substantially amorphous silica-alumina portion besides the crystalline zeolite portion, the total Si content and the total Al content were determined by X-ray fluorescence spectrometry employing a Siemens MRS 400 multi-channel spectrometer.

The surface area was determined in accordance with a modified BET/$N_2$ method (ASTM method D 3037), wherein the relative partial pressure of the gas phase, $p/p_o$ was in the range of about 0.01–0.06 ($p=N_2$ partial pressure in the gas phase, at the test conditions; $p_0$=vapor pressure of $N_2$ at its boiling point under the test conditions).

Pore volume was determined by mercury intrusion porosimetry carried out at room temperature and a mercury pressure ranging from an initial pressure of 0 psig to a final pressure of 60,000 psig using an Autopore 9200 instrument of Micromeritics, Norcross, Ga. The average pore diameter was calculated by first dividing the pore volume by surface area to obtain a number Q and then multiplying Q by 4.

These analytical methods are well known to those skilled in the art and have been disclosed in U.S. Pat. Nos. 4,663,025 and 4,975,399, disclosures of which are incorporated herein by reference.

TABLE I

Sorption Data

|  | T-4480 | Acid-leached T-4480 | Base-leached T-4480 | Invention Composition |
|---|---|---|---|---|
| Surface Area (m²/g) | | | | |
| micro- | 212.10 | 285.30 | 227.80 | 308.50 |
| meso- | 174.20 | 148.60 | 170.70 | 157.00 |
| BET | 386.30 | 433.90 | 398.50 | 465.40 |
| Pore Volume (ml/g) | | | | |
| micro | 0.0898 | 0.1203 | 0.0939 | 0.1268 |
| meso- | 0.4492 | 0.6829 | 0.4035 | 0.6269 |
| Total | 0.5351 | 0.5806 | 0.5294 | 0.6856 |
| Avg Pore Radius (Å) | | | | |
| micro- | 28 | 27 | 27 | 29 |
| meso | 63 | 157 | 62 | 166 |
| Porosity(%) | 48.48 | 55.33 | 43.99 | 50.31 |

Microproe size <20Å
Mesoproe size 20–500Å
Macroproe size >500Å

The results shown in Table I demonstrate that the composition of the present invention had significantly higher surface area, pore volume, and pore radius than than original zeolite T-4480, or acid-leached T-4480, or base-leached T-4480.

TABLE II

Element Weight %

|  | T-4480 | Acid-leached T-4480 | Base-leached T-4480 | Invention Composition |
|---|---|---|---|---|
| Aluminum | 12.80 | 3.10 | 12.70 | 2.50 |
| Silicon | 32.10 | 40.50 | 30.90 | 38.70 |
| Sodium | 0.11 | 0.12 | 0.32 | 0.15 |
| Magnesium | 0.31 | 0.18 | 0.30 | 0.15 |
| Calcium | 0 | 0 | 0.08 | 0 |

[a]The atomic weight % is expressed as 100% times the element weight divided by the total weight of the respective zeolites.

Table II shows that acid-leached zeolite had considerably reduced aluminum (and thus alumina) content and that silicon (and therefore silica) content was reduced by base-treatment. Because acid treatment significantly reduced the aluminum content, the invention composition showed a relatively-increased silicon content as compared to T-4480.

EXAMPLE II

This example illustrates the use of the catalyst composition described in Example I as catalysts in the conversion of aliphatic hydrocarbons to olefins and BTX.

A quartz reactor tube (inner diameter 1 centimeter; length 60 centimeter) was filled with a 20 centimeter bottom layer of Alundum® alumina (inert, low surface area alumina), 5 grams of one of the catalysts in the middle 20 centimeter of the tube, and a 20 centimeter top layer of Alundum® alumina. The liquid feed was a gasoline obtained from Phillips Petroleum Company, Bartlesville, Okla. and contained hydrocarbons shown in Table III. The liquid feed shown in Table III is summarized as: 34 weight percent (%) lights ($C_5$s and $C_6$s); 1.3% benzene; 5.6% toluene; 9.3% $C_8$ aromatics; 22.3% nonaromatics in BTX boiling range; and 27% heavies ($C_8$+). The feed was introduced into the reactor at a rate of 14 ml/hour (10.44 g/hour). The reaction temperature was 600° C. The reactor effluent was cooled and separated into a gaseous phase and a liquid phase. Both phases were analyzed by gas chromatographs at intervals of about 1 hour. Six hours after the feed was started, reactor effluent was sampled and analyzed by gas chromatography for olefins and BTX content. Table IV below illustrates the production of olefins and BTX from the Table III feed and individual catalyst compositions produced in Example I. Total olefins included are ethylene and propylene.

TABLE III

Hydrocarbon Analysis Cat Cracked Gasoline

|  | n-par-affins | Iso-paraffins | Aro-matics | Naph-thenes | Olefins | Total |
|---|---|---|---|---|---|---|
| $C_1$ | 0.000 | 0.000 | 0.000 | 0.000 | 0.000 | 0.000 |
| $C_2$ | 0.000 | 0.000 | 0.000 | 0.000 | 0.000 | 0.000 |
| $C_3$ | 0.000 | 0.000 | 0.000 | 0.000 | 0.000 | 0.000 |
| $C_4$ | 0.000 | 0.000 | 0.000 | 0.000 | 0.018 | 0.018 |
| $C_5$ | 1.292 | 8.147 | 0.000 | 0.169 | 10.741 | 20.348 |
| $C_6$ | 0.749 | 7.164 | 1.266 | 1.972 | 7.135 | 18.287 |
| $C_7$ | 0.740 | 4.576 | 5.354 | 2.746 | 6.483 | 19.899 |
| $C_8$ | 0.760 | 3.234 | 8.120 | 2.531 | 0.830 | 15.475 |
| $C_9$ | 0.187 | 2.070 | 8.187 | 0.708 | 0.125 | 11.278 |
| $C_{10}$ | 0.163 | 1.193 | 5.155 | 0.072 | 0.048 | 6.631 |
| $C_{11}$ | 0.153 | 0.307 | 3.606 | 0.191 | 0.000 | 4.257 |
| $C_{12}$ | 0.115 | 0.974 | 0.768 | 0.088 | 0.000 | 1.946 |
| $C_{13}$ | 0.048 | 0.000 | 0.000 | 0.000 | 0.000 | 0.048 |
| $C_{14}$ | 0.000 | 0.000 | 0.000 | 0.000 | 0.000 | 0.000 |
| Total | 4.208 | 27.664 | 32.547 | 8.478 | 23.381 | 98.188 |
| Total $C_{15}+$ |  |  |  |  |  | 0.108 |
| Total Unknowns: |  |  |  |  |  | 1.704 |

TABLE IV

Olefins and BTX Production (weight percent except ratios)

|  | T-4480 (Control) | Acid-leached T-4480 | Invention Composition |
|---|---|---|---|
| Total olefins | 19 | 15 | 25 |
| BTX | 42 | 48 | 38 |
| Ratio of olefins to BTX | 0.45 | 0.31 | 0.66 |

The results presented in Table IV demonstrate that untreated zeolite (control) produced significantly more BTX than olefins. Using an acid-leached catalyst decreased the ratio of produced olefins to BTX. However, with the invention catalyst composition, the olefins to BTX ratio surprisingly and significantly increased.

Reasonable variations, modifications and adaptations for various usages and conditions can be made within the scope of the disclosure and the appended claims, without departing from the scope of this invention.

That which is claimed:

1. A process of making a composition for use in converting hydrocarbons, said process comprises: (1) contacting a zeolite with a base in an amount and under a condition effective to reduce the silica content of said zeolite to produce a base-leached zeolite; and (2) contacting said base-leached zeolite with an acid in an amount and under a condition effective to reduce the alumina content of said base-leached zeolite.

2. A process according to claim 1, wherein said base is selected from the group consisting of tetramethylammonium hydroxide, tetraethylammonium hydroxide, tetrapropylammonium hydroxide, tetramethylammonium bisulfide, tetraethylammonium bisulfide, lithium hydroxide, sodium hydroxide, sodium hydrosulfide, sodium bisulfide, potassium hydroxide, calcium hydroxide, magnesium hydroxide, sodium bicarbonate, sodium carbonate, sodium oxide, sodium sulfide, magnesium oxide, calcium oxide, calcium carbonate, sodium phenoxide, barium phenoxide, calcium phenoxide, $R^1OM$, $R^1SM$, and combinations of any two or more thereof wherein $R^1$ is selected from the group consisting of $C_1$–$C_{18}$ alkyl radicals and combinations of any two or more thereof and M is selected from the group consisting of alkali metal, alkaline earth metal, and combinations of any two or more thereof.

3. A process according to claim 1, wherein said base is selected from the group consisting of sodium hydroxide, sodium carbonate, and combinations thereof.

4. A process according to claim 1, wherein said acid is selected from the group consisting of organic acids, inorganic acids, and combinations of any two or more thereof.

5. A process according to claim 1, wherein said acid is selected from the group consisting of sulfuric acid, hydrochloric acid, nitric acid, phosphoric acid, ammonium sulfate, ammonium chloride, ammonium nitrate, formic acid, acetic acid, trifluoroacetic acid, citric acid, trichloroacetic acid, p-toluenesulfonic acid, methanesulfonic acid, partially neutralized acids and combinations of any two or more thereof.

6. A process according to claim 1, wherein said acid is selected from the group consisting of nitric acid, hydrochloric acid, and combinations thereof.

7. A process of making a composition for use in converting hydrocarbons, said process comprises: (1) contacting a ZSM-5 zeolite with an aqueous solution of a base to produce a base-leached zeolite; (2) separating said base-leached zeolite from the spent aqueous solution; (3) drying said base leached zeolite; (4) calcining said base-leached zeolite; (5) contacting said base-leached zeolite with an aqueous solution of an acid to produce a base-acid-leached zeolite; (6) separating said base-acid-leached zeolite from spent aqueous solution containing acid; (7) drying said base-acid-leached zeolite; and (8) calcining said base-acid-leached zeolite.

8. A process of making a composition for use in converting hydrocarbons, said process comprises: (1) contacting a ZSM-5 zeolite with an aqueous solution of a base at a pH higher than 12, at a temperature in the range of from 70 to 120° C., under about 1 atm pressure, and for a period of from 1 to 20 hours to produce a base-leached zeolite; (2) separating said base-leached zeolite from the spent aqueous solution; (3) drying said base-leached zeolite; (4) calcining said base-leached zeolite; (5) contacting said base-leached zeolite with an aqueous solution of an acid at a pH lower than 0.5, at a temperature in the range of from 70 to 120° C., under about 1 atm pressure, and for a period of from 1 to 20 hours to produce a base-acid-leached zeolite; (6) separating said base-acid-leached zeolite from spent aqueous solution containing acid; (7) drying said base-acid-leached zeolite; and (8) calcining said base-acid-leached zeolite.

* * * * *